United States Patent
Schulz et al.

(10) Patent No.: US 9,929,550 B2
(45) Date of Patent: Mar. 27, 2018

(54) ELECTRICAL CONNECTION AND JUNCTION BOX FOR A SOLAR CELL MODULE AND METHOD FOR MAKING AN ELECTRICAL CONNECTION THEREOF

(75) Inventors: Uwe Schulz, Hagen (DE); Pavlos Platanos, Luedenscheid (DE)

(73) Assignee: Kostal Industrie Elektrik GmbH, Luedenscheid (DE)

( * ) Notice: Subject to any disclaimer, the term of this patent is extended or adjusted under 35 U.S.C. 154(b) by 1725 days.

(21) Appl. No.: 13/311,951

(22) Filed: Dec. 6, 2011

(65) Prior Publication Data

US 2012/0192940 A1    Aug. 2, 2012

(30) Foreign Application Priority Data

Jan. 29, 2011    (DE) .................... 10 2011 009 717

(51) Int. Cl.
- *H01L 31/042* (2014.01)
- *H02G 3/16* (2006.01)
- *H02S 40/34* (2014.01)

(52) U.S. Cl.
CPC ............. *H02G 3/16* (2013.01); *H02S 40/34* (2014.12); *Y10T 29/49213* (2015.01)

(58) Field of Classification Search
CPC .................................................. H01L 31/0485
USPC ........................................................ 136/244
See application file for complete search history.

(56) References Cited

U.S. PATENT DOCUMENTS

| 4,356,251 | A  | * | 10/1982 | Cohen ...................... G03F 7/34 |
|           |    |   |         | 430/253                              |
| 5,948,175 | A  |   | 9/1999  | Glenn                                |
| 7,097,516 | B2 | * | 8/2006  | Werner ................. H01R 13/112 |
|           |    |   |         | 439/709                              |
| 7,920,385 | B2 |   | 4/2011  | Yoshikawa et al.                     |
| 2008/0216887 | A1 | * | 9/2008 | Hacke et al. ................ 136/244 |
| 2009/0086444 | A1 |   | 4/2009 | Yoshikawa et al.                     |
| 2011/0092094 | A1 |   | 4/2011 | Rueggen et al.                       |

FOREIGN PATENT DOCUMENTS

| DE | 69704540 T2    | 8/2001  |
| DE | 1120062002980 T5 | 10/2008 |
| DE | 102008028462 A1 | 12/2009 |
| DE | 102009053018 A1 | 5/2010  |

* cited by examiner

*Primary Examiner* — Shannon M Gardner
(74) *Attorney, Agent, or Firm* — Brooks Kushman P.C.

(57) ABSTRACT

A solar assembly includes an electrical connection and junction box and a solar cell module. The junction box has an electrically conducting structure including an electrical conductor path. The solar cell module has an electrical conductive strip. A flexible electric conductor is connected with the conductor path and is materially bonded with the conductive strip in an electrically conducting manner such that the conductor path electrically contacts the conductive strip via the electric conductor.

16 Claims, 1 Drawing Sheet

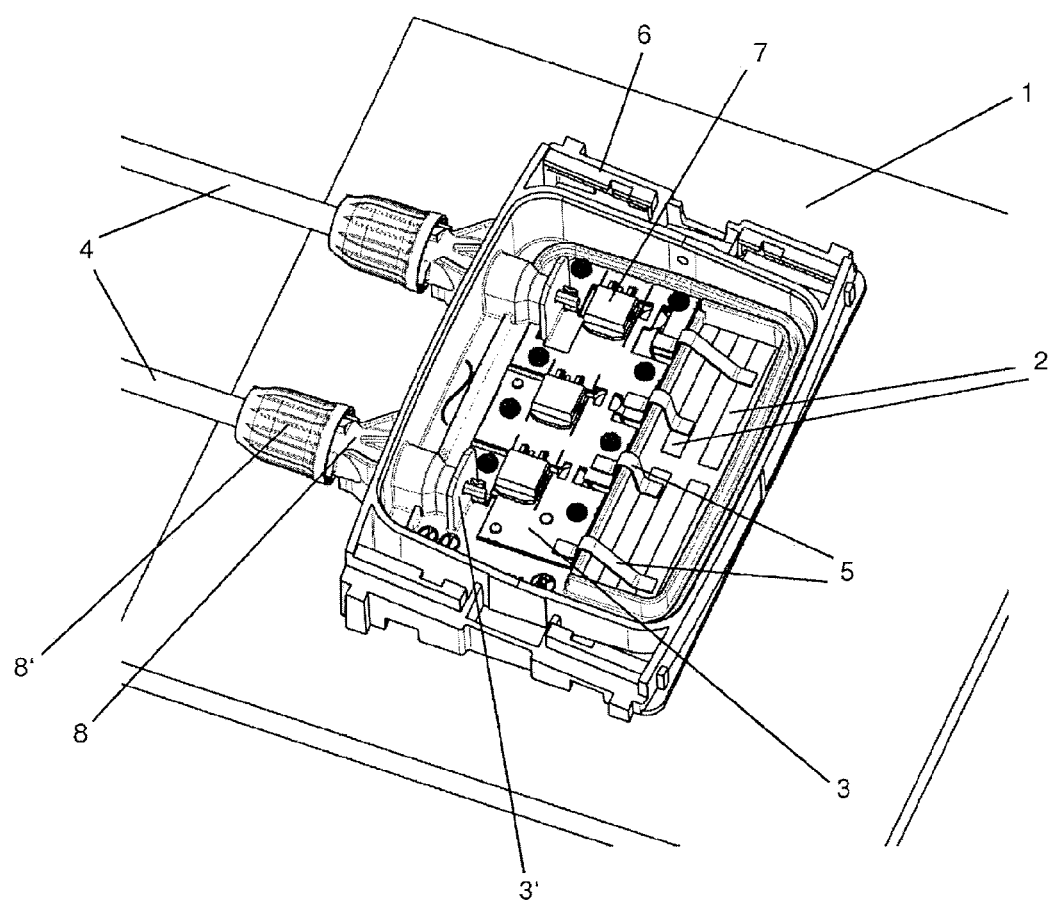

ELECTRICAL CONNECTION AND JUNCTION BOX FOR A SOLAR CELL MODULE AND METHOD FOR MAKING AN ELECTRICAL CONNECTION THEREOF

CROSS-REFERENCE TO RELATED APPLICATIONS

This application claims foreign priority benefits under 35 U.S.C. § 119(a)-(d) to DE 10 2011 009 717.1, filed Jan. 29, 2011; the disclosure of which is hereby incorporated by reference in its entirety.

TECHNICAL FIELD

The present invention relates to a solar assembly having an electrical connection and junction box and a solar cell module in which the junction box has an electrically conducting structure including electrical conductor paths for electrically contacting electrical conductive strips of the solar cell module with external connecting lines.

The present invention also relates to a method for making an electrical connection between the conductor paths of the conducting structure of the junction box and the conductive strips of the solar cell module.

BACKGROUND

A solar assembly includes an electrical connection and junction box ("junction box") and a solar cell module. The junction box includes an electrically conducting structure having electrical conductor paths. The solar cell module includes a plurality of individual solar cells and a plurality of thin electrically conductive strips. The conductive strips electrically connect the solar cells to one another. The individual conductive strips typically have a thickness of a few tenths of a millimeter and a width of a few millimeters. The conductive strips are routed along the back side of the solar cells such that the conductive strips are readily accessible from that side and can be connected directly with the conductor paths of the conducting structure of the junction box.

In order to make the connection between the conductive strips of the solar cell module and the conductor paths of the conducting structure of the junction box, the conductive strips are loosened section-wise from the solar cell module and inserted into the lower housing part of the junction box from below. The junction box is placed onto the solar cell module with the lower housing part of the junction box being fastened onto the solar cell module. The conductive strips can then be connected by hand to the electrical connector device provided in the housing of the junction box. The junction box has a removable cover for this purpose. The conductor paths enclosed by the conducting structure of the connector device are power buses, for example. The conductor paths are fabricated as stamped parts made of sheet metal having good electrical conductivity. The conductor paths are fastened in the lower part of the housing in a suitable arrangement to form the conducting structure. Clamping springs are used in order to contact the conductive strips with the conductor paths. For example, the clamping springs are inserted on the conductive strips and the conductor paths in connection regions provided for this purpose. The conductive strips from the solar cell module originating from below with respect to the housing of the junction box are thereby bent so that they are then contacted from above through the clamping springs and thereby attached to the connector device. This type of contacting requires extensive handling of the conductive strips, which handling can only be automated to a small extent.

SUMMARY

An object of the present invention is a solar assembly having an electrical connection and junction box and a solar cell module in which the junction box enables extensive automatically implementable contacting of the conductive strips of the solar cell module and thereby contributes in a meaningful way to cost savings and quality improvement.

Embodiments of the present invention are directed to a solar assembly having an electrical connection and junction box and a solar cell module. The junction box includes an electrically conducting structure having electrical conductor paths. The solar cell module includes a plurality of solar cells interconnected by thin electrical conductive strips. The conductor paths of the conducting structure are for electrically contacting the conductive strips of the solar cell module with external connection lines. The solar assembly further includes one or more flexible electric conductors. The electric conductors electrically connect the conductor paths of the junction box and the conductive strips of the solar cell module to one another. To this end, in an embodiment, the electric conductors are connected with the conductor paths and are materially bonded with the conductive strips in an electrically conducting manner.

Embodiments of the present invention are directed to a method for making an electrical connection between the conductor paths of the conducting structure of the junction box and the conductive strips of the solar cell module. The method includes connecting a conductor path of the junction box with a conductive strip of the solar cell module using a flexible electric conductor. The electric conductor is connected with the conductor path by a first bonding method that produces an electrically conducting connection which is materially bonded with the conductor path. The electric conductor is connected with the conductive strip by a second bonding method that produces an electrically conducting connection which is materially bonded with the conductive strip.

A solar assembly in accordance with embodiments of the present invention includes an electrical connection and junction box and a solar cell module. The junction box includes an electrically conducting structure having electrical conductor paths. The solar cell module includes solar cells interconnected by electrical conductive strips. The solar assembly further includes flexible electric conductors for electrically connecting the conductor paths and the conductive strips to one another. The electric conductors are connected with the conductor paths and are materially bonded with the conductive strips in an electrically conducting manner.

In an embodiment, woven wire mesh belts are used as the electric conductors for the electrical connection between the conductor paths and the conductive strips. In an embodiment, the woven wire mesh belts are thin tinned copper wires. The woven wire mesh belts may be mesh-works of wires having individual diameters of a few hundredths of a millimeter. As such, the woven wire mesh belts thus have significantly greater flexibility than solid material with similar dimensions for a width of several millimeters and a thickness of roughly no more than one millimeter.

The method for making an electrical connection between the conductor paths of a conducting structure of the junction box and a conductive strip of the solar cell module in accordance with embodiments of the present invention employs a flexible electric conductor. The electric conductor is connected with the conductor path by a first bonding method that produces an electrically conducting connection which is materially bonded with the conductor path. The electric conductor is connected with the conductive strip by a second bonding method that produces an electrically conducting connection which is materially bonded with the conductive strip. The electric conductor can be connected on one side to the conductor path before assembly of the junction box onto the solar cell module, and preassembled to an appropriate length. During the assembly of the junction box onto the solar cell module, only the electrical connection with the conductive strip need be made. An alternative is both ends of the electric conductor being initially connected with their respective contacting partners during the assembly of the junction box onto the solar cell module. The electric conductor, in the form of a woven wire mesh belt for example, is thereby supplied from a supply roll by a robot both with the conductor path and the conductive strip, connected by welding to the conductor path and the conductive strip, and cut to the required lengths.

The above features, and other features and advantages of the present invention are readily apparent from the following detailed description thereof when taken in connection with the accompanying drawings.

BRIEF DESCRIPTION OF THE DRAWINGS

FIG. 1 illustrates a solar assembly having an electrical connection and junction box and a solar cell module in accordance with an embodiment of the present invention.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIG. 1, a solar assembly in accordance with an embodiment of the present invention is shown. The solar assembly includes an electrical connection and junction box ("junction box") and a solar cell module 1. The solar assembly is shown in FIG. 1 in an oblique top perspective view.

The junction box includes an electrically conducting structure having electrical conductor paths 3. Solar cell module 1 includes a plurality of solar cells (not shown) interconnected by thin electrical conductive strips 2. Conductor paths 3 of the conducting structure of the junction box are for electrically contacting conductive strips 2 of solar cell module 1 with external connection lines 4. The solar assembly further includes one or more flexible electric conductors 5. Electric conductors 5 electrically connect conductor paths 3 and conductive strips 2 to one another.

Conductive strips 2 of solar cell module 1 have a thickness of several tenths of a millimeter and a width of several millimeters. Conductive strips 2 are made accessible in a connection region of solar cell module 1 through an opening in its rear glass cover and can be used there directly for connection purposes.

In this connection region, the junction box is placed onto solar cell module 1. Housing 6 of the junction box is seen in FIG. 1 from which a removable cover has been lifted off. Conductive strips 2 of solar cell module 1 are accessible in this state through an opening provided for this purpose in the base of housing 6 of the junction box. This accessibility enables contact to be made with conductor paths 3 of electrically conducting structure present in housing 6. After replacing the cover on housing 6, it also protects the opening in the rear glass cover of solar cell module 1.

The electrically conducting structure includes conductor paths 3 fabricated as flexible stamped parts made of sheet metal having good electrical conductivity. Conductor paths 3 serve to connect both of the outer (i.e., in FIG. 1, conductive strips 2 lying to the right inside the junction box) directly with connection lines 4 that lead to the terminal (e.g., directly to a power inverter) or to other connection and junction boxes. The two inner conductive strips 2 (i.e., in FIG. 1, conductive strips lying to the left inside the junction box) are connected to one another as well as with the two outer conductive strips 2 with the respective interposition of a so-called bypass diode 7. Bypass diodes 7 are connected anti-parallel to the solar cells and cause a shaded solar cell inside a solar cell module 1 to block a solar cell from contributing further to the total voltage of solar cell module 1, but nonetheless maintain the current flow. Solar cell module 1 thereby only exhibits a reduced operating voltage, but does not fail completely, which would be the case without bypass diodes 7. In addition, no more power is converted in the shaded solar cells so that damage to the shaded solar cells can be prevented.

The two connecting lines 4 are implemented as insulated round cables. The connecting lines are introduced into connector openings 8 on the outside of housing 6. The connecting lines have conduction branches that are electrically connected directly to conductor paths 3 by welded or soldered support points 3'. Welded or soldered support points 3' are arranged directly behind connector openings 8 inside housing 6 of the junction box. Union nuts 8' are used to fasten connecting lines 4 to connector openings 8.

In order to contact conductive strips 2 of the conducting structure of the junction box with conductor paths 3 of solar cell module 1, a plurality of flexible electric conductors 5 are provided. Electric conductors 5 are in the form of woven wire mesh belts. For instance, electric conductors 5 are in the form of woven wire mesh belts made of thin, tinned copper wires. Electric conductors 5 are electrically connected by a material bond to conductor paths 3 and to conductive strips 2. This materially bonded electrically conducting connection is achieved by a welded or soldered connection. In an embodiment, the materially bonded electrically conducting connection is achieved by resistance welding. In resistance welding, the components to be joined to one another are melted in the region of their contact point by a current flowing through them, and are bonded to one another by the application of pressure. As an alternative to welding or soldering, an electrically conducting adhesive bond (e.g., one made with a silver conducting glue) is used.

In the illustrated embodiment, conductor paths 3 of the conducting structure of the junction box are fabricated as flexible stamped parts from a sheet material having good electrical conductivity, for example, from hot dip tinned sheet copper. In this case, the connection of electric conductor 5 is made respectively with conductor path 3 and also with conductive strip 2 of solar cell module 1 as welded contacts. Here, electric conductor 5 is removed directly from a supply roll by a robot in the form of a woven wire mesh belt and is connected both to conductor path 3 and to conductive strip 2 respectively by a welded contact, and then cut to the required lengths.

In an alternative embodiment, the electrically conducting structure of the junction box is implemented on a copper clad circuit board. Here, a soldered connection is used for connecting electric conductor 5 to conductor path 3 of this electrically conducting structure. The connection of electrical conductors 5 to conductive strips 2 of solar cell module 1 is independently carried out by welded connections. For such a grouping, in particular, it is advantageous to connect electric conductor 5, which in this case also consists of woven wire mesh belts, before the assembly of the junction box onto solar cell module 1 to conductor paths 3 of the conducting structure on the circuit board by soldering, and then shortening them to the respective appropriate lengths. Induction soldering, bar soldering, or thermode soldering can be used as the soldering method. During the assembly of the junction box onto solar cell module 1, the electrical connection of electric conductor 5 to conductive strips 2 of solar cell modules 1 is then likewise carried out by a robot using a welded contact.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A solar assembly comprising:
   an electrical connection and junction box having an electrically conducting structure including an electrical conductor path;
   a solar cell module having an electrical conductive strip; and
   a flexible electric conductor materially bonded with the conductor path in an electrically conducting manner and materially bonded with the conductive strip in an electrically conducting manner, without the conductive strip being bent to be materially bonded with the electric conductor, such that the conductor path electrically contacts the conductive strip via the electric conductor, wherein the electric conductor is a woven wire mesh belt.

2. The assembly of claim 1 wherein:
   the woven wire mesh belt is of tinned copper wires.

3. The assembly of claim 1 wherein:
   the electric conductor is resistance welded with the conductive strip such that the electric conductor is materially bonded with the conductive strip.

4. The assembly of claim 1 wherein:
   the electric conductor is resistance welded with the conductor path such that the electric conductor is materially bonded with the conductor path and the electric conductor is resistance welded with the conductive strip such that the electric conductor is materially bonded with the conductive strip.

5. The assembly of claim 1 wherein:
   the conductor path is a stamped part.

6. The assembly of claim 1 wherein:
   the conducting structure includes a plurality of conductor paths on a copper clad circuit board.

7. A method for making an electrical connection between an electrical conductor path of an electrically conducting structure of an electrical connection and junction box and an electrical conductive strip of a solar cell module, the method comprising:
   connecting a flexible electric conductor at one end with the conductor path by a first bonding process that produces an electrically conducting connection which is materially bonded with the conductor path, wherein the electric conductor is a woven wire mesh belt; and
   connecting the electric conductor at another end with the conductive strip by a second bonding process that produces an electrically conducting connection which is materially bonded with the conductive strip, without the conductive strip being bent to be materially bonded with the electric conductor, such that the conductor path electrically contacts the conductive strip via the electric conductor.

8. The method of claim 7 wherein:
   the woven wire mesh belt is of tinned copper wires.

9. The method of claim 7 wherein:
   the first bonding process includes soldering.

10. The method of claim 9 wherein:
    the second bonding process includes welding.

11. The method of claim 10 wherein:
    the second bonding process includes resistance welding.

12. The method of claim 7 wherein:
    the first and second bonding processes include resistance welding.

13. A solar assembly comprising:
    an electrical connection and junction box having an electrically conducting structure including an electrical conductor path;
    a solar cell module having an electrical conductive strip; and
    a flexible electric conductor materially bonded with the conductor path in an electrically conducting manner and materially bonded with the conductive strip in an electrically conducting manner such that the conductor path electrically contacts the conductive strip via the electric conductor, wherein the electric conductor is a woven wire mesh belt.

14. The assembly of claim 13 wherein:
    the woven wire mesh belt is of tinned copper wires.

15. The assembly of claim 13 wherein:
    the electric conductor is resistance welded with the conductive strip such that the electric conductor is materially bonded with the conductive strip.

16. The assembly of claim 13 wherein:
    the electric conductor is resistance welded with the conductor path such that the electric conductor is materially bonded with the conductor path and the electric conductor is resistance welded with the conductive strip such that the electric conductor is materially bonded with the conductive strip.

* * * * *